(12) United States Patent
Sargin et al.

(10) Patent No.: US 8,913,103 B1
(45) Date of Patent: Dec. 16, 2014

(54) METHOD AND APPARATUS FOR FOCUS-OF-ATTENTION CONTROL

(75) Inventors: Emre Sargin, Mountain View, CA (US); Rodrigo Carceroni, Mountain View, CA (US); Huazhong Ning, San Jose, CA (US); Wei Hua, Palo Alto, CA (US); Marius Renn, San Jose, CA (US); Hrishikesh Aradhye, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 403 days.

(21) Appl. No.: 13/363,948

(22) Filed: Feb. 1, 2012

(51) Int. Cl.
*H04N 7/14* (2006.01)

(52) U.S. Cl.
USPC ...................................... 348/14.12

(58) Field of Classification Search
USPC ......... 348/14.1, 14.08, 14.09, 14.12; 709/204
See application file for complete search history.

(56) References Cited

U.S. PATENT DOCUMENTS

| | | | |
|---|---|---|---|
| 5,701,153 A * | 12/1997 | Reichek et al. ............. | 348/14.1 |
| 6,243,683 B1 | 6/2001 | Peters | |
| 6,816,836 B2 | 11/2004 | Basu et al. | |
| 7,007,235 B1 | 2/2006 | Hussein et al. | |
| 7,219,062 B2 | 5/2007 | Colmenarez et al. | |
| 7,664,246 B2 | 2/2010 | Krantz et al. | |
| 7,684,982 B2 | 3/2010 | Taneda | |
| 7,822,607 B2 | 10/2010 | Aoki et al. | |
| 7,860,718 B2 | 12/2010 | Lee et al. | |
| 7,864,210 B2 | 1/2011 | Kennedy | |
| 8,019,175 B2 | 9/2011 | Lee et al. | |
| 2002/0176604 A1 | 11/2002 | Shekhar et al. | |
| 2004/0008635 A1* | 1/2004 | Nelson et al. ................ | 370/260 |
| 2004/0128350 A1* | 7/2004 | Topfl et al. .................... | 709/204 |
| 2004/0172252 A1 | 9/2004 | Aoki et al. | |
| 2004/0172255 A1 | 9/2004 | Aoki et al. | |
| 2005/0071427 A1* | 3/2005 | Dorner et al. ................. | 709/204 |
| 2005/0206721 A1* | 9/2005 | Bushmitch et al. ......... | 348/14.09 |
| 2005/0212908 A1* | 9/2005 | Rodman et al. ............ | 348/14.08 |
| 2005/0243168 A1* | 11/2005 | Cutler ........................ | 348/14.12 |
| 2005/0254440 A1* | 11/2005 | Sorrell ......................... | 370/264 |
| 2006/0215752 A1 | 9/2006 | Lee et al. | |
| 2006/0247927 A1 | 11/2006 | Robbins et al. | |
| 2007/0285505 A1 | 12/2007 | Korneliussen | |
| 2009/0322854 A1 | 12/2009 | Ellner | |
| 2010/0220172 A1 | 9/2010 | Michaelis | |
| 2011/0093273 A1 | 4/2011 | Lee et al. | |
| 2011/0131144 A1 | 6/2011 | Ashour et al. | |
| 2012/0002002 A1* | 1/2012 | Shaffer et al. .............. | 348/14.09 |

* cited by examiner

*Primary Examiner* — Mohammad Islam
(74) *Attorney, Agent, or Firm* — Morris & Kamlay LLP (57) ABSTRACT

Disclosed are methods for automatically generating commands to transform a video sequence based on information regarding speaking participants derived from the audio and video signals. The audio stream is analyzed to detect individual speakers and the video is optionally analyzed to detect lip movement to determine a probability that a detected participant is speaking. Commands are then generated to transform the video stream consistent with the identified speaker.

20 Claims, 10 Drawing Sheets

METHOD AND APPARATUS FOR FOCUS-OF-ATTENTION CONTROL

BACKGROUND

In videography, human camera operators generally attempt to provide the best visual experience to their viewing audience. In video, the best visual experience can sometimes be attained by drawing a viewer's attention to what is considered important in a video scene. A camera operator can show the important part of the video scene, or focus-of-attention (FOA) region, to the viewer by manually operating the video camera. The manual operation of the camera permits the camera operator to execute desired video transformations such as cuts, zooms, pans and tilts.

For example, in a live television interview between an interviewer and an interviewee, when the interviewer is speaking, the FOA region may be a region surrounding the interviewer's face. Similarly, when the interviewee is speaking, the FOA region may be a region surrounding the interviewee's face. Typically however, focusing a viewer's attention to important parts of the video, like the interviewer's or interviewee's face, involves human intervention by the camera operator.

SUMMARY

Disclosed herein are methods, apparatuses and systems for virtual camera control implemented by one or more computing devices. In one embodiment, a method for virtual camera control includes acquiring at one or more computing devices a media stream having an audio component and a video component; processing the video component to detect one or more participant locations; processing the audio component to detect one or more speaking participants; processing the audio component to determine a speaking state for one or more detected speaking participants; associating a first participant location of the one or more participant locations with a first speaking participant of the one or more speaking participants based on the determined speaking state and the processed audio and video components; and applying at least one video transformation to the video component based at least in part on the associated first participant location.

A further embodiment of this disclosure includes an apparatus for virtual camera control implemented by one or more computing devices, including a memory; and a processor operative to retrieve instructions from the memory and execute them to acquire at one or more computing devices a media stream having an audio component and a video component; process the video component to detect one or more video participants; process the video component to determine a video speaking state for one or more detected video participants; process the audio component to detect one or more audio participants; process the audio component to determine an audio speaking state for one or more detected audio participants; identify a speaking participant based on the determined video speaking state and the determined audio speaking state; and apply at least one video transformation to the video component based at least in part on the identified speaking participant.

A yet further embodiment of this disclosure includes a method for virtual camera control implemented by one or more computing devices, including acquiring at one or more computing devices a media stream having an audio component and a video component; processing the video component to detect the location of one or more video participants; processing the audio component to detect the location of one or more audio participants; processing the audio component to determine an audio speaking state for one or more detected audio participants; identifying a speaking participant location based on the determined audio speaking states and the detected locations of the one or more audio participants and the detected locations of the one or more video participants; and applying at least one video transformation to the video component based at least in part on the identified speaking participant location.

BRIEF DESCRIPTION OF THE DRAWINGS

The various features, advantages and other uses of the present apparatus will become more apparent by referring to the following detailed description and drawing in which.

DETAILED DESCRIPTION

Embodiments of a virtual camera mechanism are described herein for performing video transformations. In some embodiments, video transformation can be applied in real-time with no human intervention. The virtual camera mechanism can operate on video streams captured by cameras that are either static or hand-held with no a priori intent of creating such video transitions. Video transformations employed by the virtual camera mechanism include zooming, panning, cutting, or tilting, among others. These video transformations are performed on a media stream containing video and audio information and are designed to simulate physical movements of a camera or camera optics on previously acquired data.

Generally, and as will be discussed in more detail below, the virtual camera mechanism can use audio analysis in addition to video analysis to enumerate the participants and their location in streaming media containing video and audio data. For each participant, the virtual camera mechanism can analyze the audio component of a media stream using silence detection and speaker diarisation to segment the audio signal into per-speaker voice tracks as well as calculate a probability that a given track is in a speaking state. The video processing pipeline can use face detection and tracking and lip motion analysis to identify and track human faces visible in the media stream and to determine a second probability for a speaking state for each of the participants. The speaking state indicates whether that participant is speaking or not. The virtual camera mechanism then merges the information from the video component of the media stream with the information from the audio component of the media stream to attempt to determine a speaking state for one or more participants.

Given a time series of speaking/not-speaking states for one or more participants, the virtual camera mechanism decides where to place a focus-of-attention (FOA) region. The FOA region may pertain to an important region of a video image that is desired to be a main focus for a viewer. The virtual camera operator applies geometric video transformations (e.g. zoom, cut, pan, tilt, etc.) to the video data in order to simulate and emphasize the appearance of the desired region. As will be discussed in more detail below, the FOA region may be emphasized via an enlarged portion of the video image, which can be attained via, for example, zooming. Changes between FOA regions (or transitions), can be attained by, for example, simulating a zoom in or zoom out, cutting, panning left or panning right and/or tilting up or down. At times, rather than being a portion of the video image, the FOA region is the entire video image. When the FOA region is the entire video image or a substantial portion of the entire video image, there may be no particular region in the frame that is desired to be the main focus for the viewer.

Relying strictly on analysis of human participant lip motion can be problematic in cases where a reliable relationship between speaking state and lip motion is difficult to discern. For example, one or more participants may turn his/her head away from the camera, one or more participants may have his/her mouth occluded for a period of time, one or more participants may move their lips in a fashion that is unrelated to speaking (chewing gum or smiling), or the illumination may become temporarily unsuitable for accurate lip motion analysis. Embodiments of this disclosure use analysis of the audio portion of a media stream to complement or replace lip motion analysis to make a virtual camera mechanism more robust.

General Overview

Figure 1:
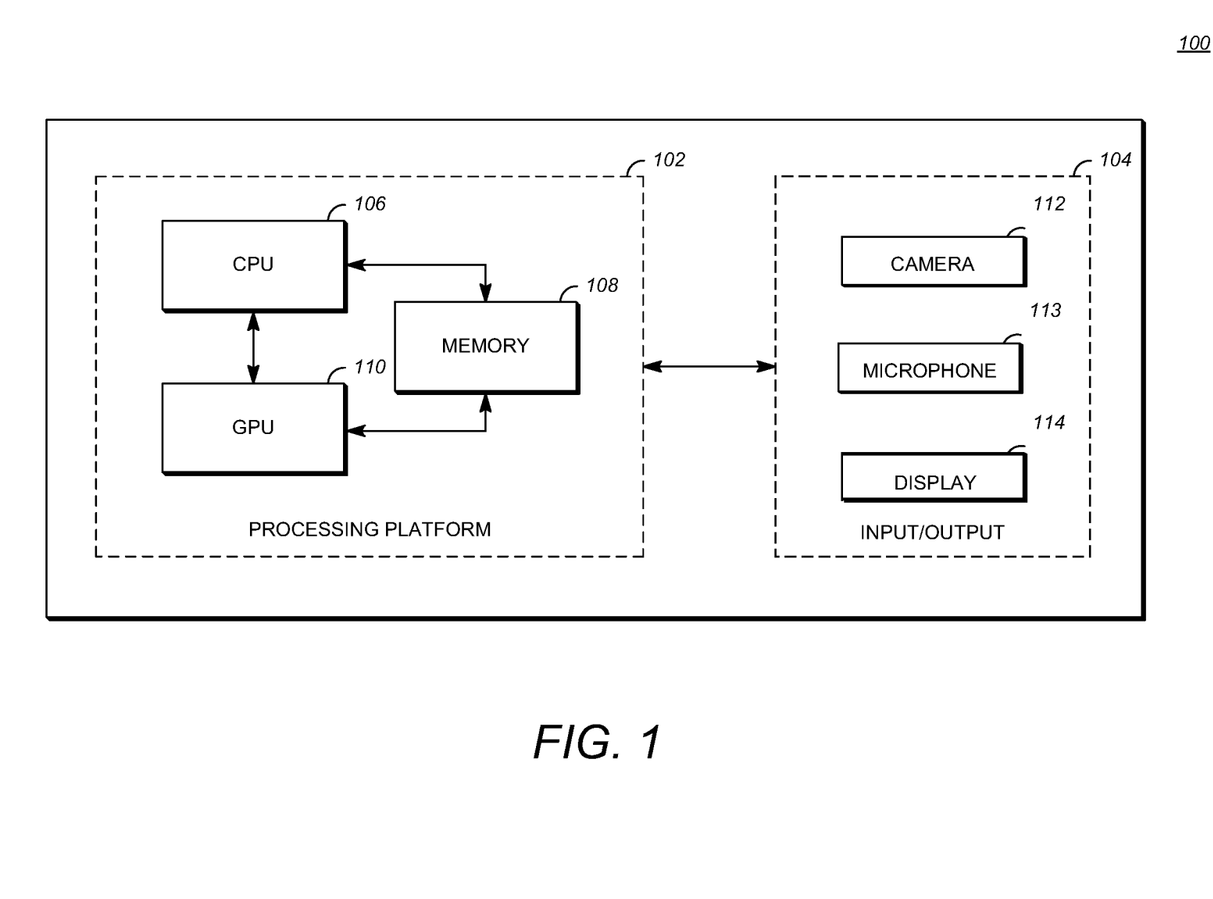
FIG. 1 is a block diagram of a device implementing a virtual camera operator mechanism according to one embodiment.

FIG. 1 is a block diagram of a device 100 implementing the virtual camera operator mechanism according to one embodiment. Device 100 may be, for example, a computer having an internal configuration of hardware having a processing platform 102 connected to and/or interfaced with input/output (I/O) devices 104. Device 100 can be, for example, a mobile phone (e.g. smartphone), a personal digital assistant (PDA), a tablet, a notebook, a computer or a netbook or any other suitable device. Device 100 can be handheld device or a static device. Device 100 can be used for video-conferencing, video-recording telecasting or any other desired video application function. Device 100 can acquire a video stream from, for example, a camera 112, from memory 108, from a storage device such as a disk drive or other storage media, or from a wired or wireless network, which could be a local area network or a wide area network such as the internet or any other source of video stream data including creating the video stream within device 100.

Processing platform 102 includes a processor such as a central processing unit (CPU) 106 and a memory 108. CPU 106 can be a controller for controlling the operations of device 100. The CPU 106 is connected to memory 108 by, for example, a memory bus. Memory 108 may be random access memory (RAM) or any other suitable memory device. Memory 108 can store data and program instructions which are used by the CPU 106. Processing platform 102 may also include a graphics processing unit (GPU) 110 that may be more effective at processing video and image data than CPU 106. GPU 110 can be present on a video card of device 100 and connected to CPU 106, can be integrated within CPU 106 or be implemented in any other suitable manner. GPU 110 can also be connected to memory 108 by, for example, a memory bus.

I/O devices 104 can acquire a media stream using, for example, include a camera 112, and a microphone 113 and transmit the media stream to the processing platform 102. Media streams including a video stream and an audio stream can also be acquired from, for example memory 108, from a storage device such as a disk drive or other storage media, or from a wired or wireless network, which could be a local area network or a wide area network such as the Internet or any other source of video stream data including creating the media stream within device 100. Camera 112 can be any device capable of capturing a video stream, which forms a video component of the media stream. Microphone 113 is any device capable of capturing audio data, which forms an audio component of the media stream. Microphone 113 may be included in camera 112. Display 114 can be any device capable of displaying output video received from the virtual camera operator mechanism. Display 114 may be implemented in various ways, including by a liquid crystal display (LCD), organic light-emitting diode display (OLED), plasma display, video projectors or a cathode-ray tube (CRT).

Other variations of device 100 are also possible for implementing the virtual camera operator. For example, camera 112 may be external to device 100, and camera 112 can transmit the video stream to device 100. Similarly, microphone 113 may be external to device 100, and microphone 113 can transmit the audio data to device 100. Further, for example, display 114 may be external to device 100, and output video can be received from device 100. As illustrated, both camera 112 and display 114 are included within device 100.

Figure 2:
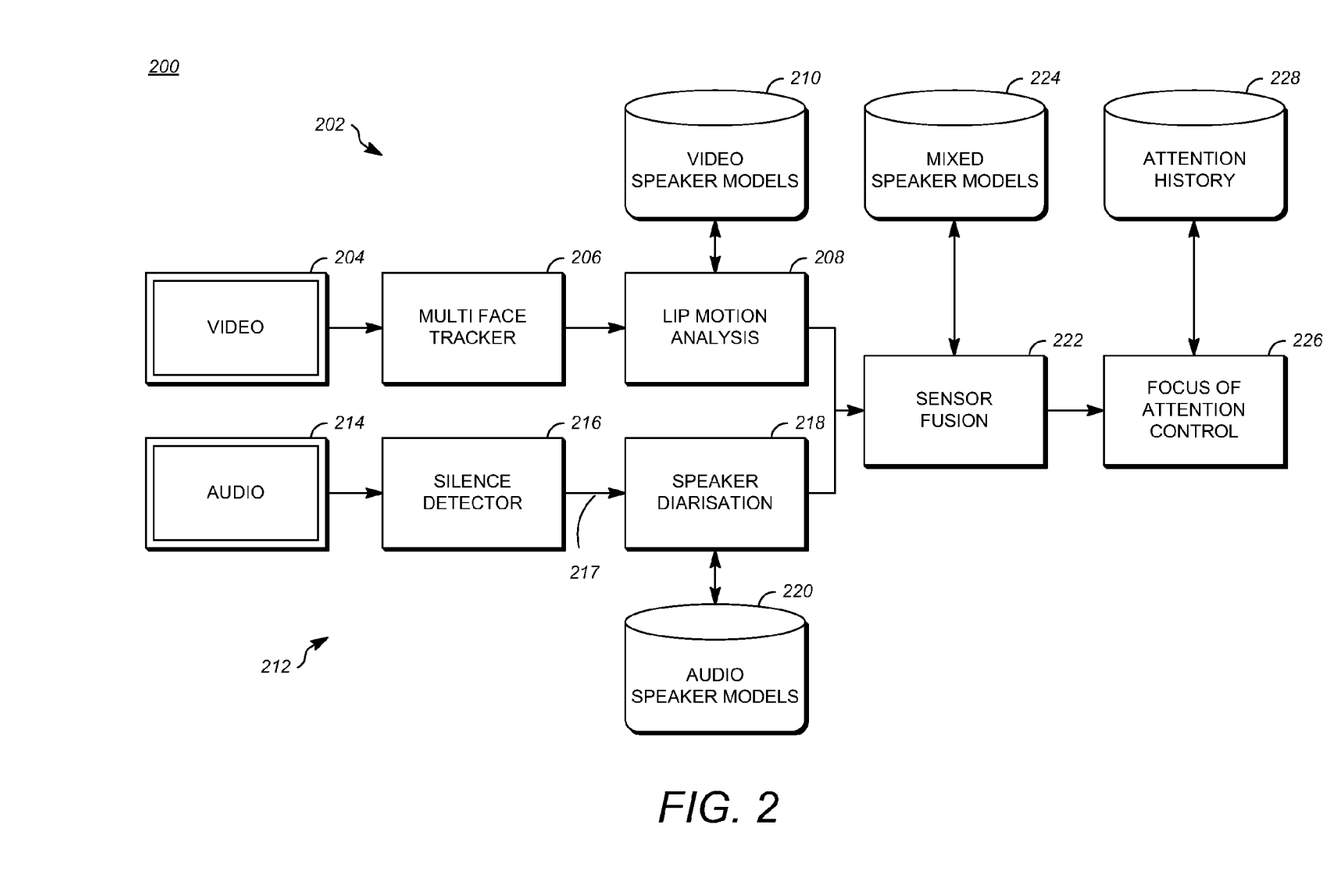
FIG. 2 is a diagram of a video stream processing pipeline for the virtual camera operator mechanism implemented in FIG. 1.

FIG. 2 is a diagram of a media processing pipeline 200 including a video processing pipeline 202 and an audio processing pipeline 212. The video processing pipeline 202 acquires as input a video stream 204 obtained from, for example, camera 112 or other source of video stream data such as memory, a storage device such as a disk drive or a network or any other source capable of creating a video stream. The video stream 204 is input to multi-face tracker unit 206 which processes the video stream 204 to detect one or more video participants. For example, the multi-face tracker unit 206 can identify and track human faces in the video stream 204. Multi-face tracker unit 206 combines face detection and face tracking to detect visible faces of participants in the video stream. Although face detection and face tracking are combined in this embodiment, in an alternative implementation, their functions may be separated into two or more discrete units. Multi-face tracker unit 206 also assigns a unique and temporally-coherent numeric id (Face Id) to each participant whose face is visible and determines the image-coordinates of facial landmarks on the face. Multi-face tracker unit 206 then uses a combination of visual template tracking and optical-flow-based feature tracking to track detected faces and facial landmarks at the desired frame-rate. Other ways of tracking detected faces including motion-based tracking or edge-based tracking may also be used. Since the detecting functions may be more computationally intensive than the tracking functions in multi-face tracker unit 206, they may be processed in separate threads and at different frequencies. In order to efficiently and accurately capture motion of the facial landmarks, for example, the detecting functions may be processed one second whereas the tracking functions may be processed at frame rate. These frequencies are merely examples and other values are possible. Additional details of multi-face tracker unit 206 will be discussed in more detail below in connection with FIG. 3.

Following processing by multi-face tracker unit 206, the video processing pipeline 202 processes the video stream 204 to determine a video speaking state for one or more of the detected video participants. In one example, the video speaking state is determined by analyzing lip motion using lip motion analysis unit 208 for one or more of the participants identified and tracked by multi-face tracker unit 206. As used herein, participants include any being or object capable of moving a facial landmark (e.g. mouth or lips). To ease of the reader's understanding of the embodiments, this description will generally refer to participants as humans; however, other participants are possible. Lip motion analysis unit 208 receives the video stream 204 and the image-coordinates of the tracked faces and facial landmarks from multi-face tracker unit 206. The lip motion analysis unit 208 provides lip-motion measurements that are representative of the motion of a participant's lips for each participant identified by multi-face tracker unit 206. The lip-motion measurements from lip motion analysis unit 208 along with the identified participants from multi-face tracker unit 206 are stored in the video speaker models database 210 where they can be accessed and processed by the sensor fusion unit 222 to determine speaking states. Additional details of the lip motion analysis unit 208 will be discussed in more detail below in connection with FIG. 4. In other embodiments, video speaker models database 210 may be eliminated and the speaking state for each participant may be determined solely on the lip-motion signal or based on alternative or additional factors.

In parallel with the video processing pipeline 202, the audio processing pipeline 212 processes an audio stream 214 obtained from, for example, microphone 113. The audio stream may be acquired from any other source of audio stream data such as memory, a storage device such as a disk drive or a network or any other source capable of creating an audio stream. The audio stream 214 is processed to detect one or more audio participants and to determine an audio speaking state for one or more detected audio participants. The audio processing pipeline detects silence in the audio stream using silence detection unit 216. The detected silence information is then output from silence detection unit 216 to speaker diarisation unit 218, where the detected silence information from silence detection unit 216 and information extracted from the audio stream 214 are combined to identify audio participants to be used to segment the audio stream into per-speaker voice tracks by speaker diarisation unit 218. This information is then stored in the audio speaker models database 220 where it can be accessed by the sensor fusion unit 222 for further processing. Additional details of the audio processing pipeline will be given in connection with the description of FIG. 5.

Sensor fusion unit 222 establishes a correspondence between tracked faces and lip motion from video speaker models database 210 and per-speaker voice tracks from audio speaker models database 220 in order to identify participants and speaking states based on the audio speaking state and the video speaking state. The speaking state is the probability that an identified participant, sometimes referred to herein as a speaking participant, is presently speaking. Sensor fusion unit 222 builds mixed-modality speaker models including speaking state for one or more of the participants identified in the video speaker models database 210 or the audio speaker models database 220 and stores them in mixed speaker models database 224. The sensor fusion unit 222 may use Bayesian inference to calculate the probabilities that a participant is identified as speaking in the video stream given the probability that a participant is identified as speaking in the corresponding audio track and vice-versa. Mixed speaker models database 224 may be incrementally refined as new data input from video stream 204 and audio stream 214 is processed by video processing pipeline 202 and audio processing pipeline 212 and stored in video speaker models database 210 and audio speaker models database 220. Focus of attention control unit 226 accepts as input participants with their speaking states indicated by sensor fusion unit 222 and mixed speaker models database 224.

Figure 3:
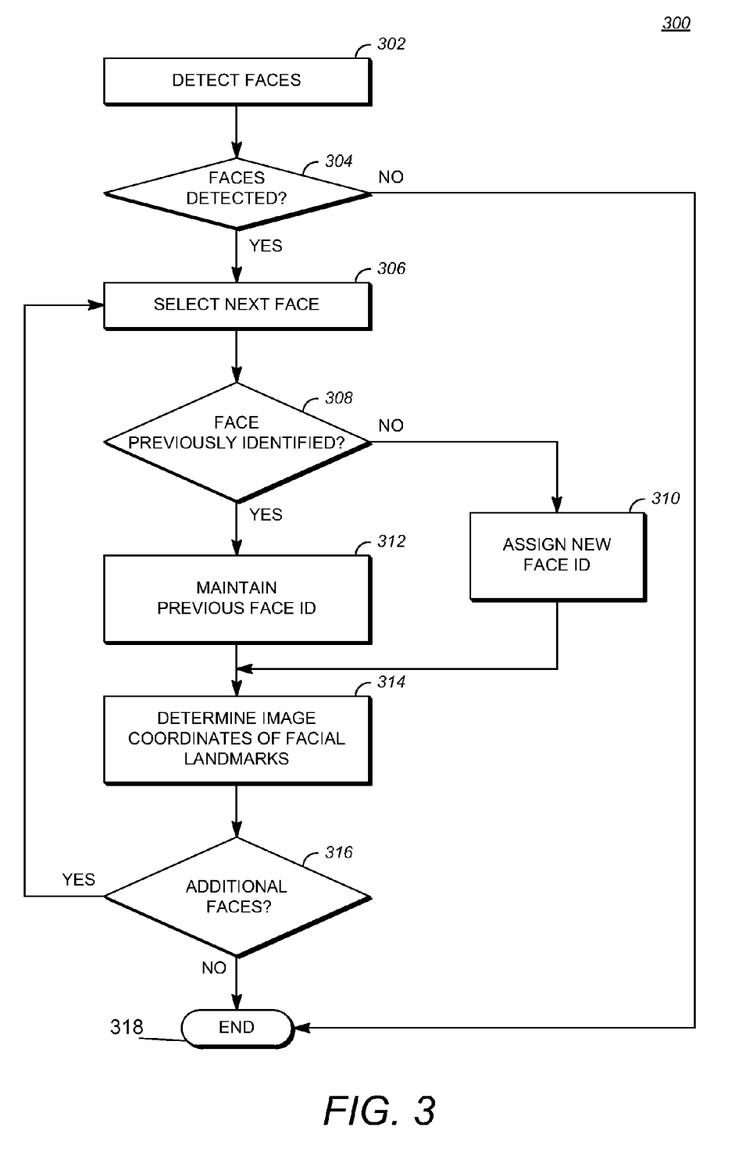
FIG. 3 is a flowchart diagram of a process of detecting faces in a multi-face tracker unit in the media stream processing pipeline of FIG. 2.

The focus of attention control unit 226 maintains an attention history database 228 which keeps track of which identified participants have been selected as the FOA. This permits the focus of attention control unit 226 to decide whether or not to perform a change in the FOA depending upon the current state of the media stream as received from sensor fusion unit 222 and past states of the media stream as stored in attention history database 228. For example, at this step, the sensor fusion unit 222 may signal that a new speaking participant is speaking. The focus of attention control unit 226 may check the attention history database and, depending upon the information therein, decide to perform a video transformation based at least in part on the new video transformation such as a pan, cut or zoom changes Multi-Face Tracker Unit FIG. 3 is a flowchart diagram of multi-face tracker process 300 for detecting faces of participants in multi-face tracker unit 206. Beginning at step 302, visible faces of participants are detected. Control then moves to decision step 304 to determine if any faces were detected in step 302. If no faces are detected, the process ends at step 318. If faces are detected, control moves to step 306 to select a detected face for processing. Control then moves to step 308 to determine if this participant's face has been previously identified in the video stream. If this face has not been previously identified, control moves to step 310 to assign unique and temporally-coherent unique ID (Face ID) to the participant. If this face has been previously identified, control moves to step 312 to maintain the Face ID that was previously assigned to this participant.

Once the Face IDs have been determined, control moves to step 314 to determine image coordinates of facial landmarks on the selected participant's face. As discussed previously, these facial landmarks can include a participant's eyes and mouth. Other facial landmarks are possible such as noses, eyebrows and ears. Once the image coordinates for the face has been determined, control moves to step 316 to determine if there are additional faces that have been detected but have not had their facial landmarks processed. If there are additional faces, control returns to step 306 to select the next detected face for processing. Otherwise, if there are no additional detected faces in the current frame, the multi-face tracker process 300 ends at step 318.

The multi-face tracker process 300 uses at least a combination of visual template tracking and optical flow to track detected faces through multiple frames at the desired frame rate until the next face detection/facial landmark result is available. Other ways of tracking detected faces including motion-based tracking or edge-based tracking may also be used. At this point the multi-face tracker process 300 synchronizes the face detection/facial landmark threads and tracks the detected face and facial landmark positions to the current frame by comparing the latest detected face positions and facial landmark positions to previously detected face and facial landmark positions so as to minimize tracking discontinuities and to keep the internal representations of the participants (Face ID's) consistent.

Lip-Motion Analysis

Figure 4:
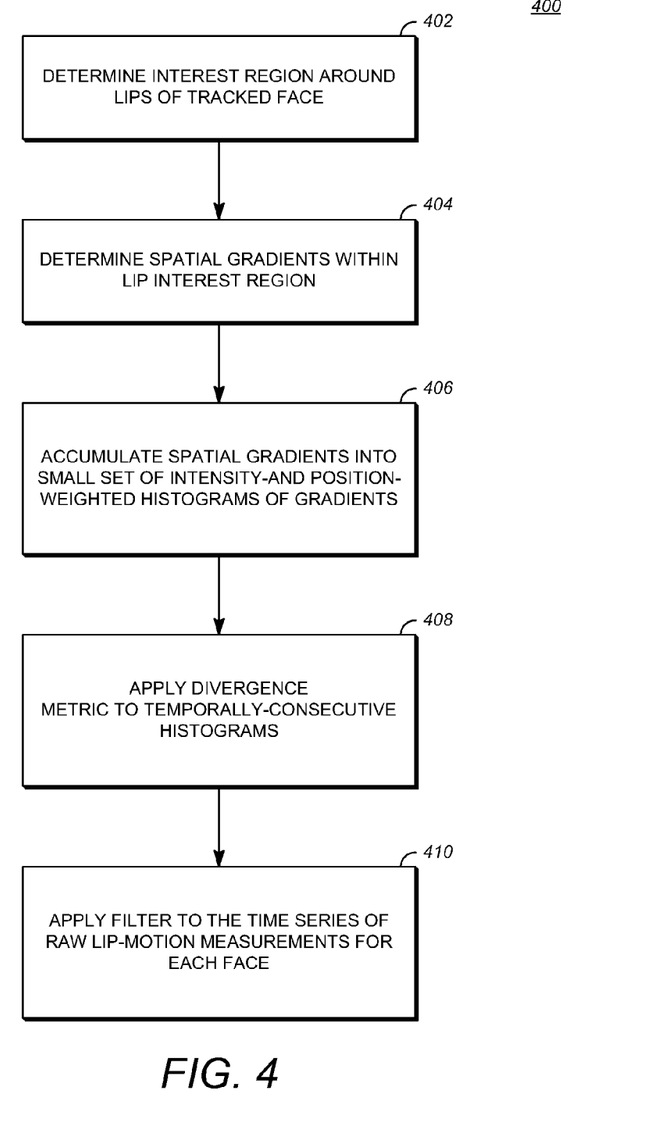
FIG. 4 is a flowchart diagram of a process of determining a lip-motion signal in a lip-motion signal unit in the media stream processing pipeline of FIG. 2.

FIG. 4 is a flowchart diagram of a lip motion analysis process 400 for determining lip motion in lip motion analysis unit 208. Beginning at determine interest step 402, the routine determines an interest region around the participant's tracked face by taking a full resolution frame from the video stream and processing it. In some embodiments of this disclosure the processing is performed by the CPU 106 with the assistance of the GPU 110 of the processing platform 102. More specifically, to determine an interest region around lips, the tracked image coordinates of both the eyes and the mouth center can be used. For each identified participant's face, the following quantities may be determined:

dh=vector from left to right eye positions,
dv=vector from centroid of two eyes to center of mouth.

Lip motion analysis process 400 then chooses an elliptical interest region of interest such that: the center is the mouth center, the major axis is parallel to dh, the length of the major axis is equal to an empirically-defined constant times the length of dh, and the length of the minor axis is equal to a second empirically defined constant times the length of dv.

Once the region of interest has been determined, control moves to spatial gradient calculation step 404 to determine spatial gradients within the region of interest. In particular, to determine spatial gradients, lip motion analysis process 400 can subtract the intensities of neighbor pixels within the interest region. Assume I(x, y) is the intensity at image coordinates (x, y). The spatial gradient calculation starts by computing the vector:

$$g(x,y)=(I(x+1,y)-I(x,y),I(x,y+1)-I(x,y)) \qquad (1)$$

where the intensity of the current pixel is subtracted from the intensity of the pixels to the right and below to form the vector g(x, y). In order to accumulate the contributions of multiple color bands at a pixel (x, y), the spatial gradient calculation 404:

(a) computes one vector g(x, y) for each color band;
(b) performs any orientation inversions needed so that each pair of vectors g(x, y) have non-negative scalar products; and
(c) computes a weighted average of the g(x, y) vectors, using as weights the coefficients of each color band in the human perception of light intensity. Alternatively the g(x, y) vectors may be weighted by other coefficients which emphasize particular hues or luminosity, which is color-neutral.

Once the spatial gradients within the lip interest region have been determined, control moves to step 406 to accumulate the spatial gradients into a set of intensity-and-position-weighted histograms of gradients. More specifically, for this accumulation, the (x, y) coordinates can be such that points (0,0), (0,1), (1,0), (1,1) correspond to the vertexes of the lip interest region's rectangular bounding box. For each lip interest region, the system computes three histograms. Each of these histograms accumulates the magnitudes of vectors g(x, y) on bins defined by a different indexing variable, as follows:

(a) Orientation histogram: each pixel (x, y) "votes" on a bin defined by the orientation of vector g(x, y) and the strength of the vote is the magnitude of g(x, y);

(b) Horizontal displacement histogram: each pixel (x, y) "votes" on a bin defined by coordinate x and the strength of the vote is the magnitude of g(x, y);

(c) Vertical displacement histogram: each pixel (x, y) "votes" on a bin defined by coordinate y and the strength of the vote is the magnitude of g(x, y).

Once the spatial gradients have been accumulated, control moves to divergence metric step 408 to apply a divergence metric to temporally-consecutive histograms to obtain a single real number, which correlates strongly with the frame-to-frame lip motion.

More specifically, given the orientation histograms of a tracked lip region at times t and t+1, divergence metric step 408 can compute a measurement of orientation change by scaling each of these histograms to unit norm and then computing their symmetrized Kullback-Leibler divergence. Analogously, the system applies the symmetrized KL divergence to obtain measurements of change for the horizontal and vertical displacement histograms. Finally, to obtain the single number that measures the temporal frame to frame change within the entire lip region, divergence metric step 408 can compute a weighted average of the orientation, vertical displacement and horizontal displacement changes, with empirically defined weights.

Once the divergence metric has been applied to temporally-consecutive histograms to obtain a single real number in divergence metric step 408, control moves to apply filter step 410 to apply a robust filter to the time series of raw lip-motion measurements for each participant's face. The filter can provide a more reliable per-face lip-motion signal. In one embodiment of this disclosure, the filter step 410 accumulates the raw lip-motion measurements into a fixed-capacity circular buffer and outputs the natural logarithm of the median of all values stored in the buffer.

Video Speaker Models

After lip motion analysis unit 208 analyzes lip motion, the lip motion data is used to identify possible speaking states for participants previously identified by multi-face tracker unit 206 and enter the information into video speaker models database 210. Lip motion analysis unit 208 constructs a model for a given participant and uses that model in conjunction with the lip-motion signal to determine a speaking-state probability. Speaker modeling may be beneficial because, in some instances, the lip-motion signal may not be sufficient to determine whether a participant is currently speaking. For example, during human speech, lips do not move all of the time such as when speaker hesitates in the midst of speaking. Further, the lip-motion signal may not be sufficient to determine whether a participant is currently speaking because the average magnitude and temporal variance of computed lip-motion signals are speaker-dependent and thus, it may be difficult to decide based solely on the current lip-motion signals which participant is more likely to be in a speaking state. Accordingly, based on the speaking-state probability, lip motion analysis unit 208 can determine a speaking state (i.e. speaking or not speaking) for each participant. Speaker modeling unit then stores and retrieves information regarding the speaker models and speaking states for each identified participant in a video speaker models database 210.

Figure 5:
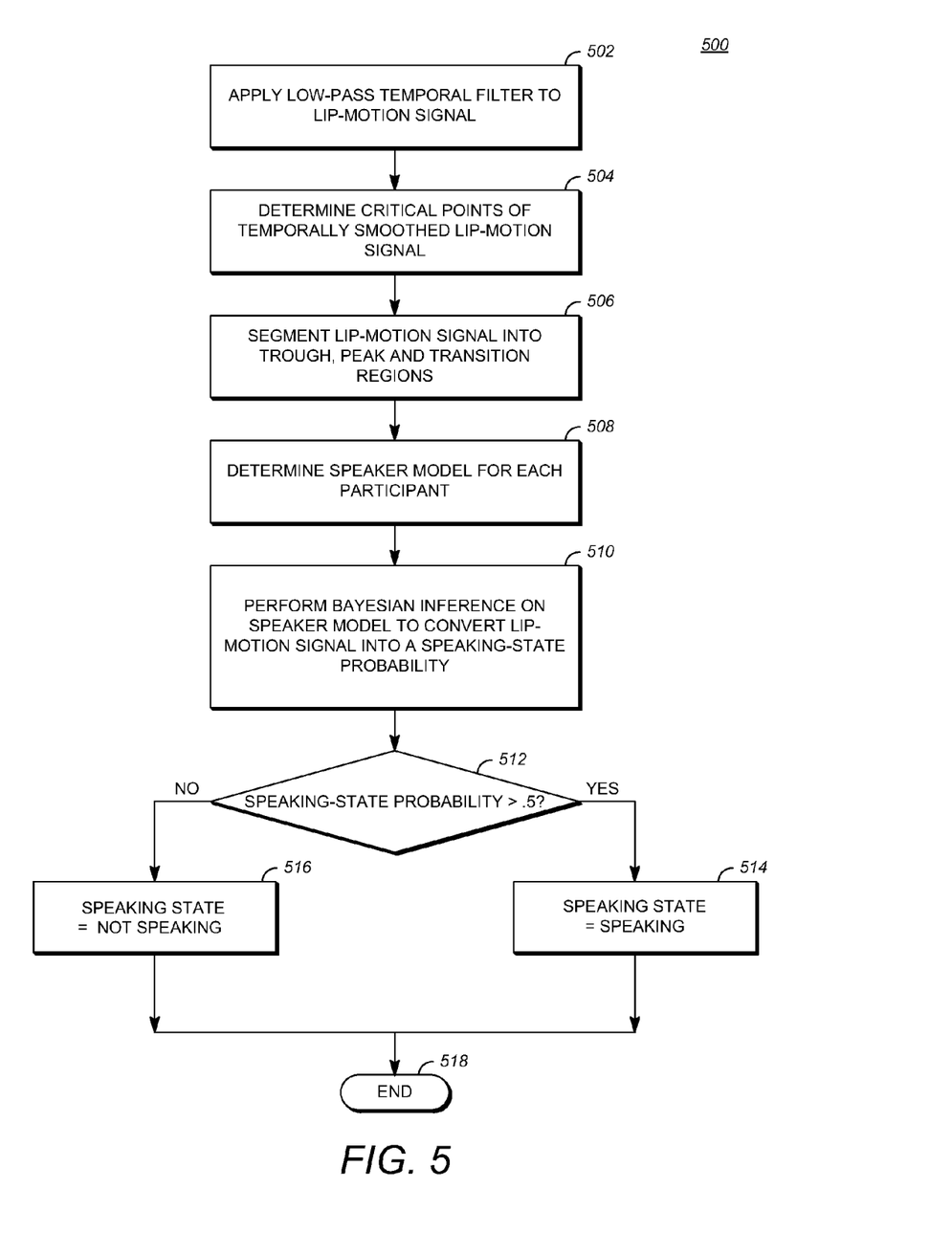
FIG. 5 is a flowchart diagram of a process of transforming the lip-motion signal into a speaking/not speaking state in a speaker modeling unit in the media stream processing pipeline of FIG. 2.

FIG. 5 is a flowchart diagram of a speaker modeling process 500 for transforming the lip motion measurements into a video speaking/not speaking state by lip motion unit 208 for storage in video speaker models database 210. Beginning at step 502, a low-pass temporal filter is applied to the lip-motion measurements from lip motion analysis process 400. Specifically, applying the filter includes computing a weighted moving average of the lip-motion measurements, with weights that are exponentially smaller for the older measurements. Once the low-pass filter has been applied, control moves to critical point step 504 to determine critical points (minimum and maximum) of the resulting temporally-smooth lip-motion measurements. Speaker modeling process 500 defines a measurement as a local minimum (or maximum) if that that measurement is smaller than (or greater then) its previous and next K neighbors in the time series, where K is empirically set. Upon detecting one such local critical point, lip motion analysis unit 208 does the following in critical point step 504:

(a) if the detected critical point is the first local critical point, it becomes the candidate critical point, (b) otherwise, if the newly detected critical point is of the same kind as the candidate critical point (i.e., either both are minima or both are maxima), then discard the less extreme of these two values and keep the most extreme as the candidate critical point, (c) otherwise, if the difference in value between the newly-detected critical point and the candidate critical point is larger than an empirically-set relevance threshold, add the candidate critical point to the set of relevant critical points and set the newly-detected critical point as the new candidate critical point, (d) otherwise, the newly-detected point is of a different kind than the candidate critical point but the difference in their values is smaller than the relevance threshold), so discard the newly-detected critical point.

Once the critical points have been determined, control moves to step 506 to segment the lip-motion signal into "trough", "peak" and "transition" regions based on accumulated statistics of the critical points. More specifically, lip motion analysis unit 208 does the following:

(a) shifts the temporal coordinates of all relevant critical points backward, so as to compensate the delays introduced in low-pass filtering, (b) segments the unsmoothed signal into temporal regions delimited by consecutive relevant critical points (which by construction consist of one minimum point and one maximum point, not necessarily in this order), (c) within each such region, chooses as trough measurements all signal values that are closer to the minimum value than an empirically-defined proportion of the minimum-maximum difference, (d) analogously, chooses as peak measurements all signal values that are closer to the maximum value than an empirically-defined proportion of the minimum-maximum difference, and (e) chooses the remaining values as transition values.

Once these "trough", "peak" and "transition" regions have been identified, control moves to speaker model step 508 to determine a possible speaker model for each participant. The speaker model step 508 accumulates the average and standard deviation of all values selected as "trough" values and the average and standard deviation of all values selected as "peak" values. For each participant, these four values are stored in the video speaker models database 210, as part of the speaker model for each participant. Once the "trough" and "peak" statistics for each participant are calculated in speaker model step 508, control moves to Bayesian inference step 510 to perform Bayesian inference on each participant in the video speaker model database to convert the lip-motion measurements for each participant into a speaking-state probability. This permits construction of speaker models in an unsupervised way with no need for labeled data. More specifically, speaker modeling process 500 can assume the "trough" and "peak" values are two Gaussian distributions with the computed averages and standard deviations and that each measurement in the time series can be explained as coming from one of these two distributions. Bayes rule can be used to compute a speaking-state probability that a given signal value comes from the peak distribution instead of the trough distribution and thereby assign a speaking state to each participant as a function of time. Speaking state refers to the probability that an identified participant is actually speaking at a given time.

After lip-motion measurements have been converted into a speaking-state probability, control moves to decision step 512 to determine if the video speaking-state probability is greater than 0.5. If the speaking-state probability is greater than 0.5, control moves to step 514 to assign the instantaneous state "speaking" to that participant and then the process ends at step 518. Otherwise, if the speaking-state probability is not greater than 0.5, control moves to step 516 to assign the instantaneous state "not speaking". The process then ends at step 518. Other probability thresholds can be used. For example, in alternative implementations, if the probability is greater than 0.7, the state of speaking can be assigned to the participant. After speaking states have been determined for all detected participants, the process ends.

Silence Detection

Figure 6:
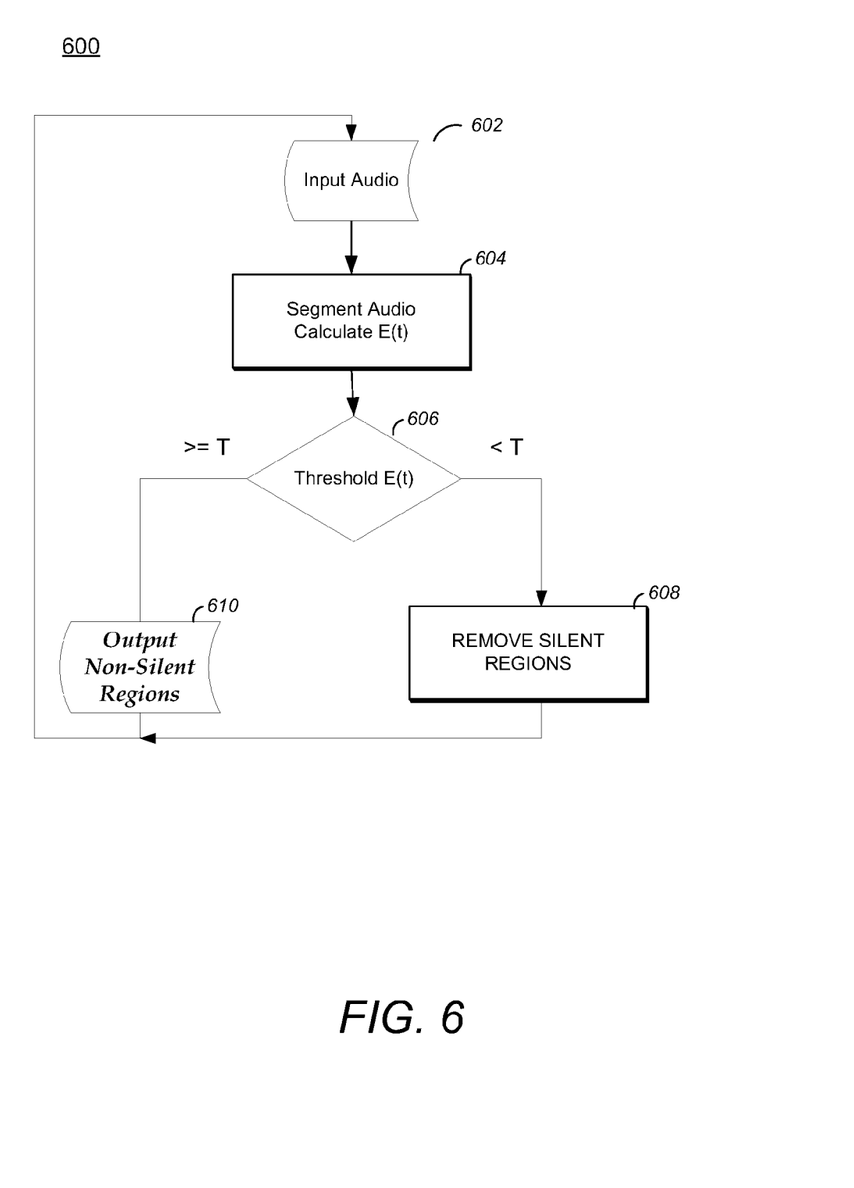
FIG. 6 is a flowchart diagram of a process of segmenting audio and removing silent regions in the media stream processing pipeline of FIG. 2.

Silence detection unit 216 is the first unit in the audio processing pipeline 212. FIG. 6 is a flowchart showing a silence detection process 600. The silence detection process 600 attempts to remove the silent segments from an audio stream representing speech. The first step 602, inputs digital samples from audio stream 214. These samples are passed to step 604 which divides the audio stream 214 into short segments by windowing according to the formula:

$$E(t) = \Sigma \times (t - L + i)w(i) \quad (2)$$
$$\quad i=1$$

where x is the audio stream signal and E is the energy of the window. This function sums the energy in the audio signal over "L" time samples after multiplying the input samples by a window function w(i). The window function w can be a Hamming window for example. In step 606, the short time energy E(t) associated with the audio segment is thresholded. If the short time energy E(t) is below a threshold τ, the audio stream at time t is considered as "possibly silent". Because the average amplitude of the audio stream is varying from scenario to scenario and even within the same audio stream, a good threshold should be adapted to the short-time energy detected. One possible adaptation would be to combine the current measure of audio energy E(t) with a weighted previous value such as:

$$\tau(t)=\alpha\tau(t-1)+(1-\alpha)E(t) \quad (3)$$

where the threshold function τ(t) at a given time t is equal to a previous value τ(t−1), weighted with value α which is a fraction selected from between 0 and 1. When a continuous "possibly silent" region is longer than a pre-determined length, this region is converted from being labeled possibly silent" to being labeled "silence segment" and is removed from the input audio in step 608. Audio segments which exceed the threshold (>=T) are labeled "non-silent" and output in step 610 for further processing. Output from the silence detection process 600 is segmented audio with silent regions removed.

Speaker Diarisation

Figure 7:
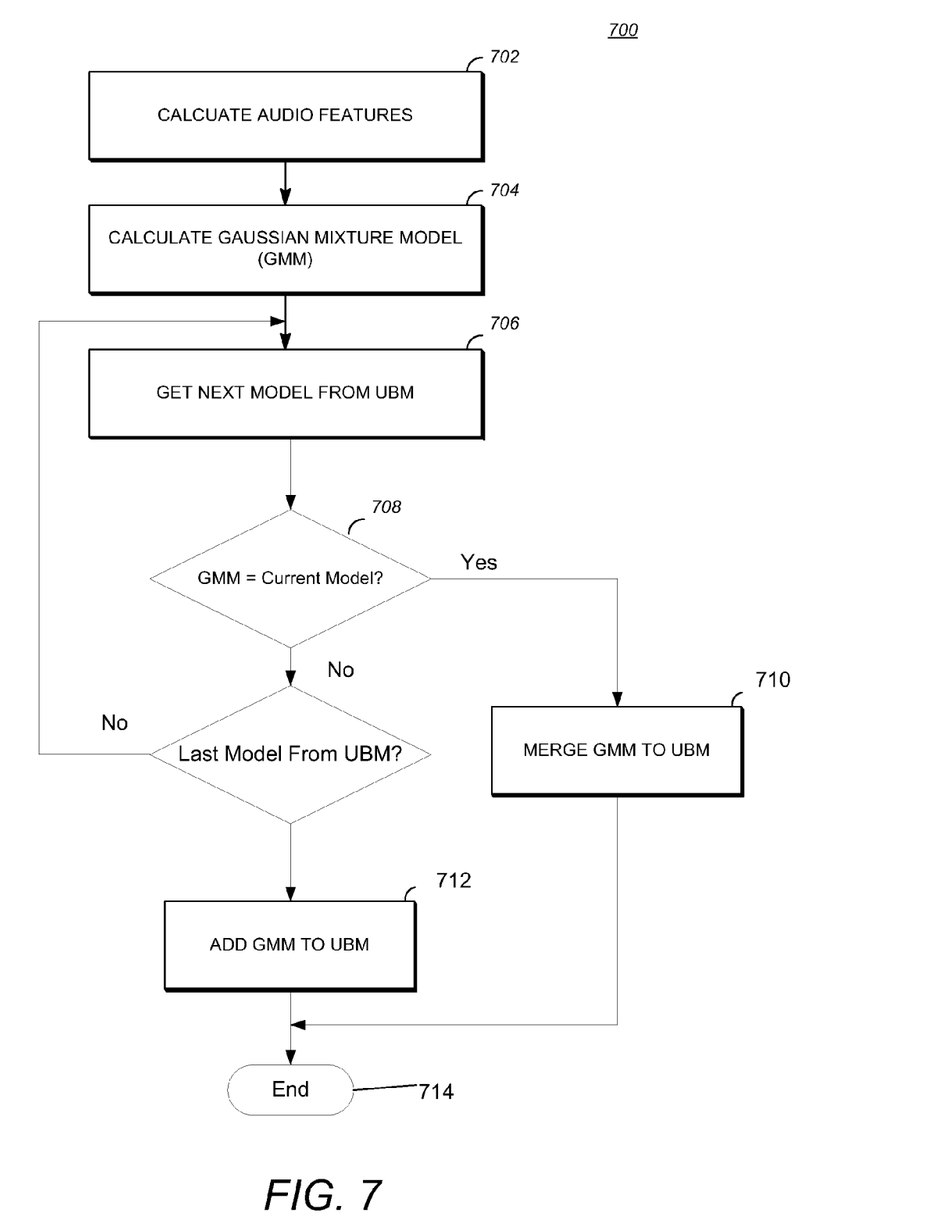
FIG. 7 is a flowchart diagram of a process of calculating a universal background model in the media stream processing pipeline of FIG. 2.

Speaker diarisation process 700 takes the output from the silence detection process 600 and identifies discrete speakers. Speaker diarisation process 700 groups segments of an input audio stream into according to the speaker identity. The speaker diarisation process extracts audio features, maintains a universal background model (UBM) and performs online speaker clustering.

FIG. 7 is a flowchart of an embodiment of the speaker diarisation process 700. Beginning at step 702, the speaker diarisation process 700 first calculates audio features for the non-silent audio segments from silence detection process 600. These features are taken from the set of standard audio features typically used for tasks such as speech recognition and include Mel-Frequency Cepstral Coefficients (MFCC), zero-crossing rate, and pitch, among others. These values are normalized and concatenated into a vector. The segments can overlap in time by as much at 80%. These audio feature vectors are then used to calculate a universal background model for audio feature vectors in step 704.

In step 704 the speaker diarisation process 700 calculates a Gaussian mixture model (GMM) for each audio feature vector extracted from the audio stream. This GMM is trained on all audio feature vectors extracted from a large number of audio streams containing speech. The GMM is a probabilistic model that attempts to group similar audio feature vectors without any a priori information on how many different groups there may actually be. The audio speaker models database 220 maintains a Universal Background Model (UBM) database of GMM's [$G_0, G_1, \ldots, G_n$], one for each speaker detected so far. The UBM is designed to represent the speech characteristics of the average speakers. When a new non-silent segment is presented to the speaker diarisation process 700, a set of feature vectors as described above is extracted from it in step 704.

In step 706, the speaker diarisation process fetches a model from the audio speaker models database 220. In step 708, the speaker diarisation process 700 compares the fetched model with the current model to determine if they are a match. The speaker diarisation process 700 uses Bayesian Information Criteria (BIC) is used to determine whether the current model can be merged with one of the exiting speaker models in the audio speaker models database 220. For example, the current model can be merged with one of the exiting speaker models new non-silent speech segment belongs to a previously identified speaker. If the current model can be merged with one of the exiting speaker models, the new vector is merged with an existing vector in step 708, and it is added to an existing model in step 710. Otherwise a model for new speaker is entered into the audio speaker models database 220 in step 712 before ending at step 714.

Sensor Fusion

Referring to FIG. 2, outputs from the video processing pipeline 202 and the audio processing pipeline 212 are combined at the sensor fusion unit 222. At any given time, the outputs from the lip motion analysis unit 208 and the speaker diarisation unit 218 processes each provide a probability that an identified face and an identified speaker are talking and the results are stored in the video speaker models databases 210 and the audio speaker models database 220.

Figure 8:
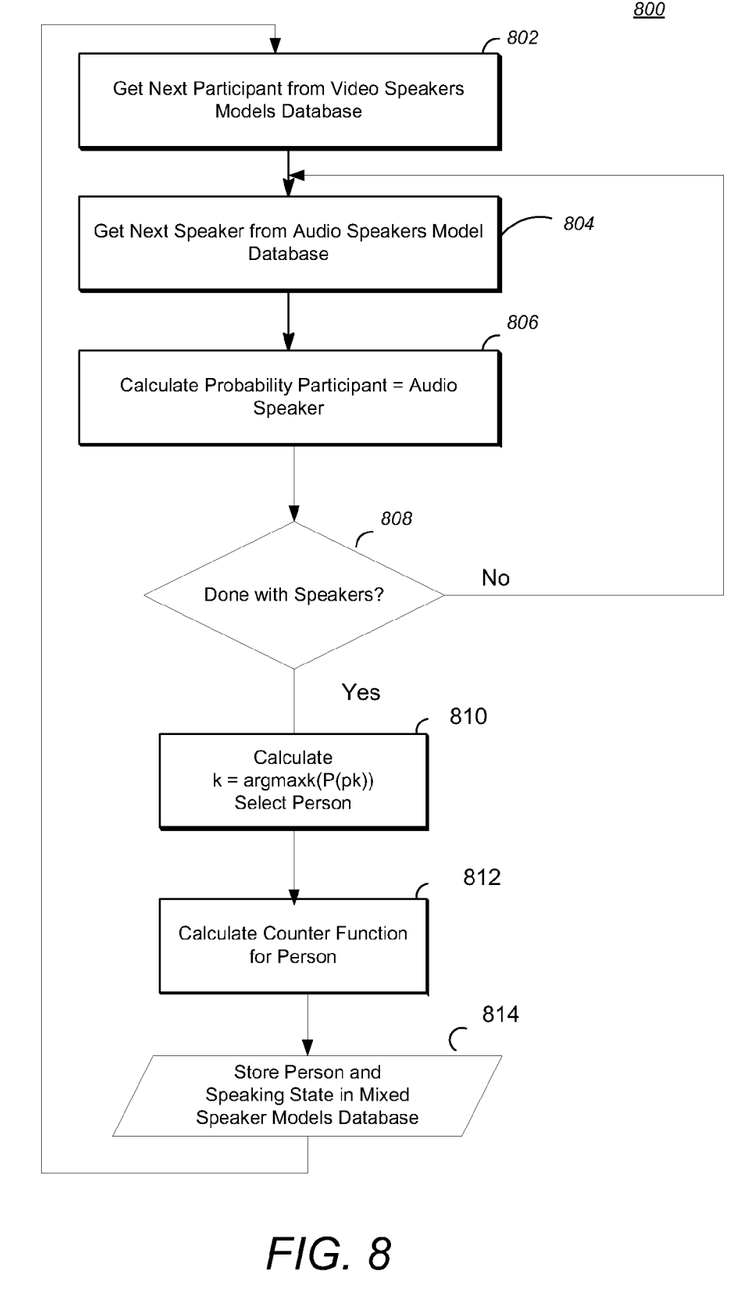
FIG. 8 is a flowchart diagram of sensor fusion processing in the media stream processing of FIG. 2.

FIG. 8 is a flowchart of processing performed by the sensor fusion unit 222. Sensor fusion processing 800 begins by selecting an identified participant from the video speaker models database 210 at step 802, along with the previously calculated speaking state. The sensor fusion process 800 then selects a speaker from the audio speaker models database 220 in step 804 along with the probability that a speaker is speaking from the audio speaker models database 220 and calculates the probability that there is an association between these two signals in step 806. If the association is confirmed, the sensor fusion unit 222 maps the identified participant and the previously calculated speaking state to a unified domain which we will refer to as a "person" and stores the unified domain or "person" in the mixed speaker model database 224 in step 814. The association is defined by a probability distribution that maps the $i^{th}$ face and $j^{th}$ speaker to a $k^{th}$ "person" with a probability $P(p_k|f_i, s_j)$. This equation is derived a follows. The probability that the kth person $p_k$ is speaking is given by:

$$P(p_k) = \sum_{i,j} P(p_k | f_i, s_j) P(f_i, s_j) \sim \sum_{i,j} P(p_k | f_i, s_j) P(f_i) P(s_j) \quad (4)$$

where P(pk) is the probability that the "kth" person is talking, P(pk|fi, sj) is the conditional probability that Pk is true (the person is talking) given the joint probability that fi and sj (the probabilities that person is from video and audio data, respectively) have occurred, P(fi, sj) is the joint probability that fi and sj both occur and P(fi) and P(sj) are the probabilities that fi or sj occurs independently. The sensor fusion routine then accesses the previously processed audio speakers by branching back at step 808 to fetch speakers from the audio database. Accordingly, the identity of the most likely person speaking may be given by:

$$k^* = \mathrm{argmax}_k(P(p_k)) \quad (5)$$

where k* is the identity of the person most likely to be speaking, and $\mathrm{argmax}_k$ is a function which returns the maximum value of all the arguments presented to it. The sensor fusion process 800 estimates the identity of the most likely person who is speaking (k*) as well as updating $P(p_k|f_i, s_i)$, the probability distribution that maps the $i^{th}$ face and $j^{th}$ speaker to a $k^{th}$ person while processing the audio and video data in step 810. This is aided by keeping a counter function $C(p_k^*, f_i, s_j)$ in the mixed speaker models database 224. The counter function is calculated in step 812 by incrementing for each frame each time a particular person, k*, is selected.

$$C(p_{k^*}, f_i, s_j) = C(p_{k^*}, f_i, s_j) + 1 \quad (6)$$

This is equivalent to increasing the confidence of mapping the $i^{th}$ face and $j^{th}$ speaker to a $k^{th}$ person. Accordingly, the conditional probability $P(p_k|f_i, s_j)$ can be estimated by:

$$P(p_k | f_i, s_j) = [C(p_k, f_i, s_j)] / [\sum_k C(p_k, f_i, s_j)] \quad (7)$$

where the counter function for a particular person k, $C(p_k, f_i, s_j)$, is divided by the total counts summed for all identified persons, $\sum C(p_k, f_i, s_j)$, summed over k. The counts received by a particular person, k, divided by the total number of counts for all identified persons can be approximately equal to the conditional probability that a person is speaking given the conditional speaking probabilities from the video and audio tracks, $f_i$ and $s_j$. The counter function is compared to the calculated conditional probability to insure consistent results. The initial values of the counter could be set as $C(p_k, f_i, s_j)=1$ if k=i and zero otherwise. Following this, the mixed speaker models database 224 is updated in step 814 with the new person and speaking state. The routine then loops back to step 802 to select the next participant identified in the video stream and associate the next detected face from the video processing pipeline 202 with a speaker identified from the audio processing pipeline 212.

Focus of Attention Control

After one or more persons and their speaking state have been determined by the sensor fusion process 800, the focus of attention control unit 226 can obtain the current FOA region from the attention history database 228, and the speaking states of each "person" in a video scene from the mixed speaker models database 224. Using this information focus of attention control unit 226 determines where to place the next FOA region using a predetermined set of temporal constraints. In one embodiment, the predetermined set includes the following:

(1) if the current FOA region is on a participant that is currently speaking (i.e. speaking state is speaking), maintain or do not shift the FOA region until the participant has stopped speaking (i.e. speaking state is not speaking);

(2) do not shift the FOA region more often than an empirically predetermined maximum frequency (to not visually disturb users); and (3) if there is no participant currently speaking (i.e. all speaking states are not speaking), shift FOA region to the entire scene by, for example, zooming.

This set of constraints is an example and additional or alternative constraints can be used. For example, rather than maintain the FOA region until the participant has stopped speaking as set forth in constraint (1), if another participant has started speaking while the original participant is still speaking, the FOA region can be shifted to reveal the entire scene. Other constraints are also possible. For example, focus of attention control unit 226 can also store the next FOA region in an attention history database 228, which may be used in determining a later FOA region. Once the next FOA region has been determined, focus of attention control unit 226 determines the transformation between the next FOA region and the current FOA region. Using such transformation, focus of attention control unit 226 applies an interpolation, which may be non-linear, between the current and next FOA regions to generate visual effects typically produced by human camera operators (e.g. zoom, pan, cut and tilt. Subsequently, focus of attention control unit 226 can, for example, up-sample the interpolated FOA region within the full-resolution input video frame from the video stream 204 and send the resulting video frame to GPU 110 for viewing on display 114.

Figure 9:
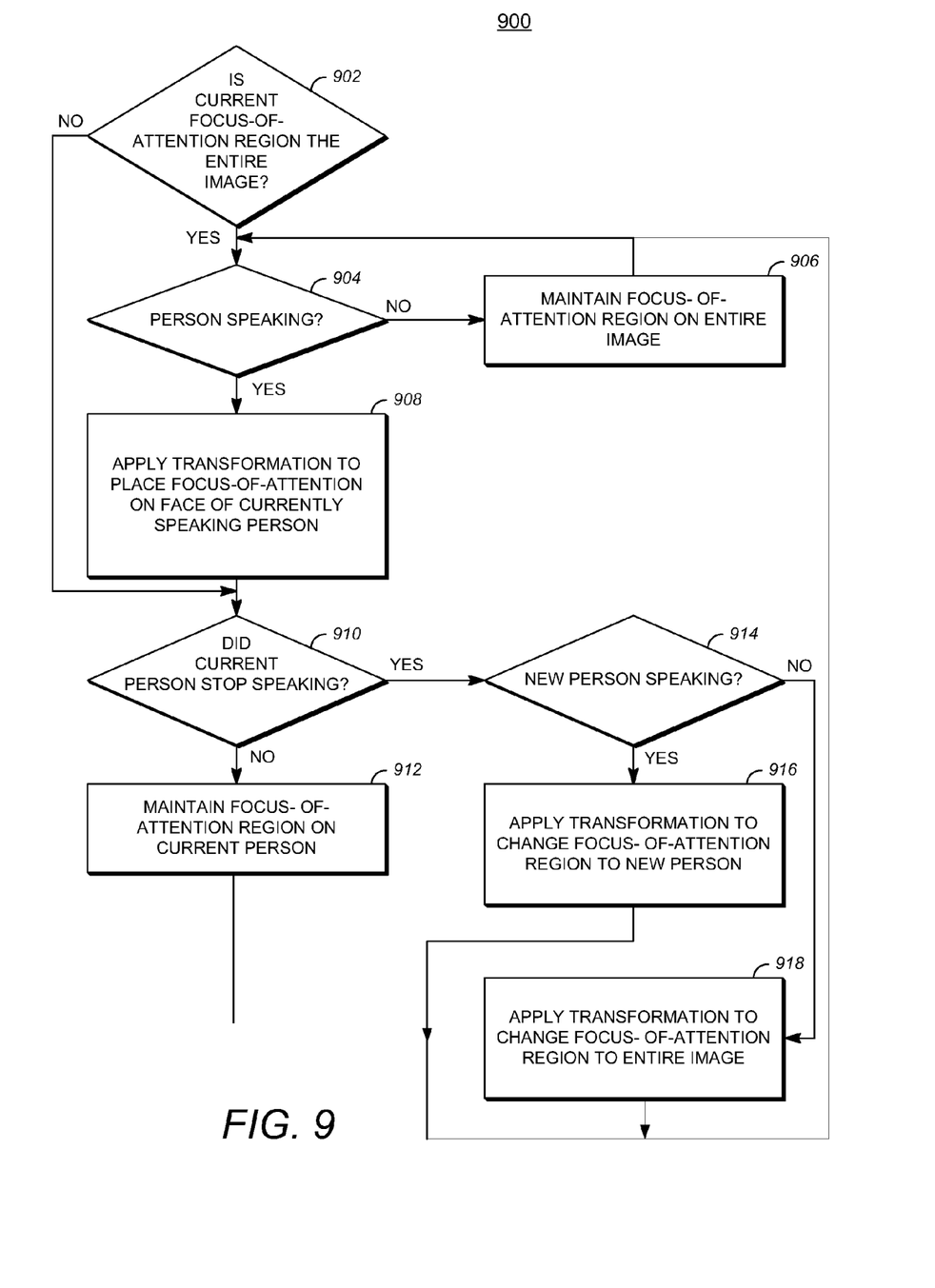
FIG. 9 is a flowchart diagram of a process of determining a focus-of-attention region in a virtual camera effects unit in the video processing pipeline of FIG. 2.

FIG. 9 is a flowchart diagram of focus of attention control process 900 for determining a FOA region in focus of attention control unit 226. Beginning at step 902, and generally following the predetermined set of three temporal constraints discussed above, focus of attention control process 900 determines if the current FOA region is the entire image. If the current FOA region is the entire region, control moves to step 904 to determine if there is a "person" currently speaking. If there is not a "person" currently speaking, control moves to step 906 to maintain the FOA region on the entire image. Control can then moves back to step 904 continually to determine if a "person" has started to speak.

If there is a participant speaking, control moves to step 908 to apply a transformation to place the FOA region (i.e. the next FOA region) on the face of the currently speaking person. As discussed previously, this transformation may involve a zoom, pan, cut or tilt operation. Further, the FOA region may or may not include areas surrounding the face of the currently speaking participant. The FOA region may be, for example a predetermined size.

Returning to step 902, if the current FOA region is not the entire image (i.e. the current FOA region is on a participant currently speaking) or if a transformation has been applied to place the FOA region on the face of a currently-speaking person in step 908, control moves to decision step 910 to determine if the current person stopped speaking. If the current person did not stop speaking, control moves to step 912 to maintain the FOA region on the current person. However, if the current person stopped speaking, control moves to step 914 to determine if there is a new speaker. If there is no person speaking, the process applies a transformation to make the FOA region the entire image in step 918 and returns to see if a new person has begun speaking in step 904. If a new person is detected speaking in step 914, control passes to step 916 where a transformation if applied to change the FOA to the new speaking person, followed by returning to step 904 to continue to check for a new person speaking.

Embodiments of the virtual operator mechanism described herein permit automatic selection FOA regions, which can fulfill a viewer's desire to view the important part of the video scene by automatically applying video transitions without human intervention. When used in, for example video-conferencing or video-recording applications with static cameras, the FOA region can be automatically selected without human intervention and the virtual operator mechanism can automatically direct the visual attention of all video conference participants to a current speaker. In addition, when the virtual operator mechanism is used in video-conferencing or video-recording applications with hand-held devices, the virtual operator mechanism permits (in addition to automatic selection of FOA region) elimination or substantially lessened spurious motion (e.g. high-frequency jitter). Also, when the virtual operator mechanism is used in applications where video is sent through a bandwidth-constrained channel, it can reduce encoding artifacts and more generally improves the visual quality of the output video by discarding pixels that are out of the FOA region and allowing a larger fraction of the available bandwidth to be used on the relevant part of the scene. Conversely, when used in applications with strict requirements on video quality, it can reduce bandwidth consumption.

Other embodiments of this disclosure can use audio analysis to replace lip-motion analysis completely. These embodiments divide the media stream into a video stream 204 and an audio stream 214 and then merge the extracted information in a sensor fusion unit 222 as described above; however, in this case the video stream 204 is mainly used for face tracking and to compute the 3D position of each participant relative to the camera along with a confidence value. The participant's distance from the camera may be computed using an a priori model of how a typical human face size varies with distance in passive video, from stereo video, time-of-flight sensors, moiré sensors, LIDAR (optical radar) or other sensors which supply 3D information. The audio processing includes the processing described above plus a routine that estimates the position of an audio source from the diarized stereo audio measurements. In this case the sensor fusion unit only combines the measurements of a speaker's 3D position from the video and audio streams, with the speaking/non speaking state supplied by the processed audio stream. The speaking/non speaking state and the combined 3D location from the sensor fusion unit are passed onto the virtual camera mechanism.

Figure 10:
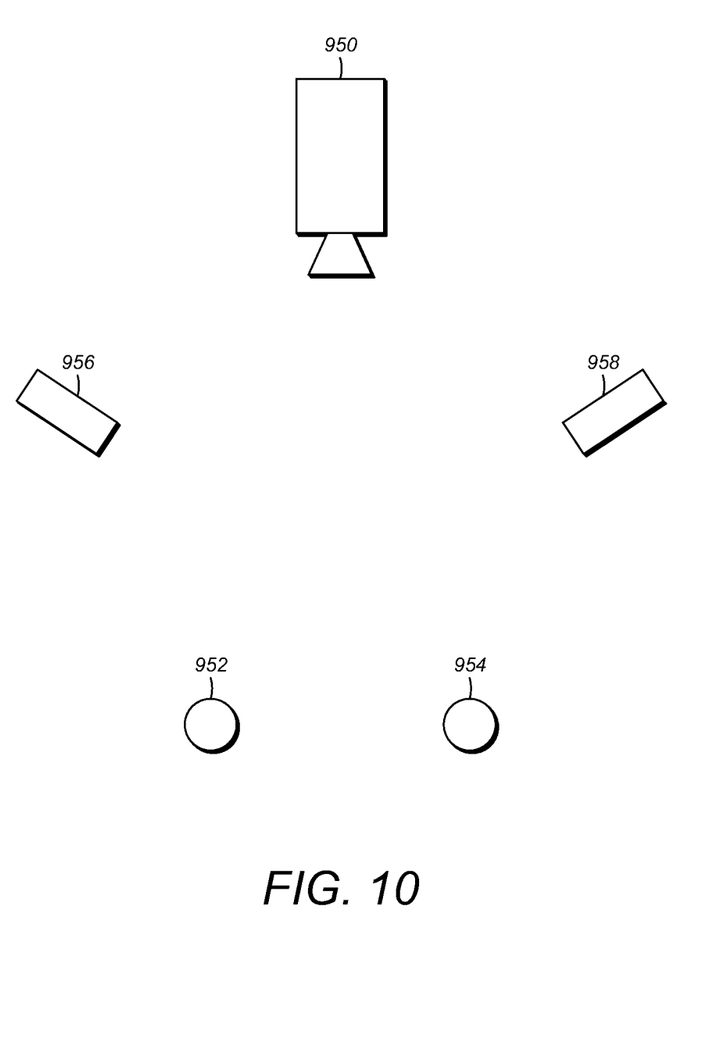
FIG. 10 is a diagram of an embodiment of this disclosure employing two or more microphones to locate participants.

FIG. 10 is an embodiment of this disclosure that uses two or more microphones to try to determine the location of a participant in a video scene. In FIG. 9, participants 952 and 954 are in the field of view of camera 950 while microphones 956 and 958 capture audio data from the scene. Camera 950 may be a standard video camera, a stereo video camera or a camera designed to capture video data while also obtaining distance information about the participants 952 and 954. Some of the ways the camera 950 may obtain 3D information includes stereopsis or triangulation. Other methods of obtaining 3D information may also be used. The camera 950 and the microphones 956 and 958 can be connected to an I/O device 104 of device 100 to input signals to the processing platform 102 for analysis. As mentioned above, one type of analysis which could be performed would be to process the signals from microphones 956 and 958 to determine, based on audio delay, where in the scene a speaking participant is located and associating that location with the locations derived from the video data to identify speaking participants.

The embodiments of device 100 implementing the virtual camera operator mechanism (and the algorithms, methods, instructions etc. stored thereon and/or executed thereby) can be realized in hardware, software, or any combination thereof including, for example, IP cores, ASICS, programmable logic arrays, optical processors, molecular processors, quantum processors, programmable logic controllers, microcode, firmware, microcontrollers, servers, microprocessors, digital signal processors or any other suitable circuit or other information processing device now existing or hereafter developed. In the claims, the term "processor" should be understood as encompassing any the foregoing, either singly or in combination. The terms "signal" and "data" are used interchangeably.

Further, in one embodiment, for example, the device 100 can be implemented using a general purpose computer/processor with a computer program that, when executed, carries out any of the respective methods, algorithms and/or instructions described herein. In addition or alternatively, for example, a special purpose computer/processor can be utilized which can contain specialized hardware for carrying out any of the methods, algorithms, or instructions described herein.

Alternatively, portions of the virtual operator mechanism implemented on the device 12 can be implemented at a location separate from the device, such as a server. In this instance, device 100 can send content to the server for processing and in turn, the server can send processed content to the device 100. For example, the device 100 can send data from camera 112 to the server, and the server can perform the processes similar to those described previously in regard to multi-face tracker unit 206. The server can in turn transmit the data generated (i.e. detected and tracked faces) to the device 100. Other suitable implementation schemes are available for device 100. Device 100 can acquire a video stream from, for example, a camera 112, from memory 108, from a storage device such as a disk drive or other storage media, or from a wired or wireless network, which could be a local area network or a wide area network such as the internet or any other source of video stream data including creating the video stream within device 100.

Further, all or a portion of embodiments of the present invention can take the form of a computer program product accessible from, for example, a non-transitory computer-usable or computer-readable medium. A non-transitory computer-usable or computer-readable medium can be any device that can, for example, tangibly contain, store, communicate, or transport the program for use by or in connection with any processor. The non-transitory medium can be, for example, an electronic device, a magnetic device, an optical device, an electromagnetic device, or a semiconductor device. Other suitable mediums are also available. As an example, the functions described in connection with the media processing pipeline 200, including any or all of the face tracker process 300, the lip motion analysis process 400, the speaker modeling process 500, the silence detection process 600, the speaker diarisation process 700, the sensor fusion process 800, and the attention control process 900, can take the form of a computer program product that is stored in and accessible from the memory 108 of the device 100 for execution by the CPU 106 of the device 100.

To the extent that the output of the multi-face tracker unit 206 and the temporally-coherent numeric id (Face Id) contain personal identifiable information, it can be the subject of appropriate security and privacy safeguards. In some embodiments, multi-face tracker unit 206 can identify and tracks human faces only for people who have signed up ("opted-in") to permit such identification and tracking. In other embodiments, however, the multi-face tracker unit 206 can identify and track human faces for all participants in a video regardless of whether they have opted in to such identification and tracking. In other embodiments, identification and tracking can be omitted for a selected group of people regardless if they have opted in. For example, identification and tracking can be omitted for those who fall under a certain age.

While this disclosure includes what is presently considered to be the most practical and preferred embodiments, it is to be understood that the disclosure is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

We claim:

1. A method for virtual camera control implemented by one or more computing devices, comprising:
    acquiring at one or more computing devices a media stream having an audio component and a video component;
    processing the video component to detect one or more video participants;
    processing the video component to determine a video speaking state indicating a probability that at least one of the one or more detected video participants are currently speaking;
    processing the audio component to detect one or more audio participants;
    processing the audio component to determine an audio speaking state indicating a probability that at least one of the one or more detected audio participants are currently speaking;
    identifying a person and a speaking state, associated with the person, based on the video speaking state and the audio speaking state; and
    applying at least one video transformation to the video component based at least in part on the identified person and speaking state.

2. The method of claim 1 wherein the processing the video component to determine a video speaking state for one or more participants further comprises:
    measuring lip motion for one or more of the detected participants.

3. The method of claim 1, wherein the processing the audio component to determine an audio speaking state for one or more audio participants further comprises:
    calculating audio features and merging the calculated audio features with a universal background model.

4. The method of claim 1, wherein the identifying a person and a speaking state based on the video speaking state and the audio speaking state is based on Bayesian inference.

5. The method of claim 1, wherein the video transformation is at least one of a zoom, a pan, a cut or a tilt.

6. The method of claim 1, wherein the video transformation comprises changing a focus of attention region.

7. An apparatus for virtual camera control implemented by one or more computing devices, comprising:
a memory;
a processor operative to retrieve instructions from the memory and execute them to:
acquire at one or more computing devices a media stream having an audio component and a video component;
process the video component to detect one or more video participants;
process the video component to determine a video speaking state indicating a probability that at least one of the one or more detected video participants are currently speaking;
process the audio component to detect one or more audio participants;
process the audio component to determine an audio speaking state indicating a probability that at least one of the one or more detected audio participants are currently speaking;
identify a person and a speaking state, associated with the person, based on the video speaking state and the audio speaking state; and
apply at least one video transformation to the video component based at least in part on the identified person and speaking state.

8. The apparatus of claim 7, wherein processing the video component to determine a video speaking state for one or more participants further comprises:
measuring lip motion for one or more of the detected participants.

9. The apparatus of claim 7, wherein processing the audio component to determine an audio speaking state for one or more audio participants further comprises:
calculating audio features and merging the calculated audio features with a universal background model.

10. The apparatus of claim 7, wherein identifying a person and a speaking state based on the video speaking state and the audio speaking state is based on Bayesian inference.

11. The apparatus of claim 7, wherein the video transformation is at least one of a zoom, a pan, a cut or a tilt.

12. The apparatus of claim 7, wherein the video transformation comprises changing a focus of attention region.

13. A method for virtual camera control implemented by one or more computing devices, comprising:
acquiring at one or more computing devices a media stream having an audio component and a video component;
processing the video component to detect one or more video participants;
processing the video component to detect a location of at least one of the one or more video participants;
processing the audio component to detect a location of at least one of one or more audio participants;
processing the audio component to determine an audio speaking state for the at least one of the one or more audio participants, the audio speaking state indicating a probability that the at least one of the one or more audio participants is currently speaking;
identifying a location of a person and a speaking state, associated with the person, based on the audio speaking state and the location of the at least one of the one or more audio participants, and the location of the at least one of the one or more video participants; and
applying at least one video transformation to the video component based at least in part on the identified location of the person and the speaking state.

14. The method of claim 13, wherein the processing the video component to detect the location of at least one of the one or more video participants comprises using a 3D data.

15. The method of claim 14, wherein the 3D data comprises one of passive video, stereo or triangulation.

16. The method of claim 13, wherein the processing the audio component to detect the location of the at least one of the one or more audio participants further comprises:
using data from two or more microphones to locate the audio participants.

17. The method of claim 13, wherein the processing the audio component to determine an audio speaking state for the at least one of the one or more audio participants further comprises:
calculating audio features and merging the calculated features with a universal background model.

18. The method of claim 13, wherein the video transformation is at least one of a zoom, a pan, a cut or a tilt.

19. The method of claim 13, wherein the video transformation comprises changing a focus of attention region.

20. The method of claim 13, wherein the processing the audio component to determine an audio speaking state for the at least one of the one or more audio participants further comprises:
calculating, for each of the one or more audio participants, a universal background model (UBM) representing a speech characteristic of a detected average speaker;
calculating a probability model (GMM) grouping similar audio features; and
merging the UBM and the GMM, when the UBM and the UM are identified as being associated with a same speaker.

* * * * *